June 24, 1969   R. L. KASTOR   3,451,264
PROCESS FOR DETERMINING THE INJECTION PROFILE OF A CASED WELL
Filed June 21, 1967
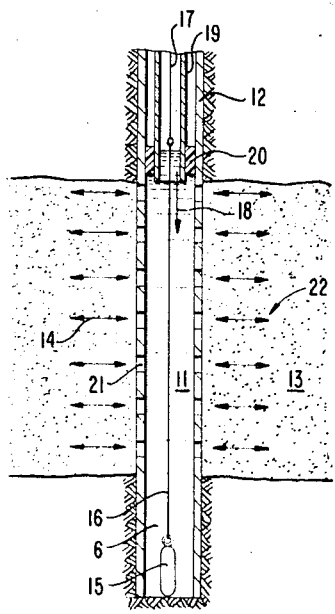
FIG. 1
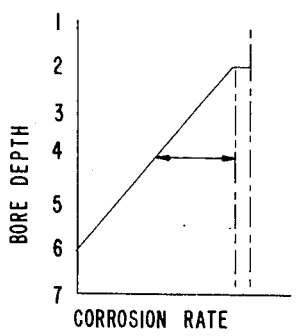
FIG. 2
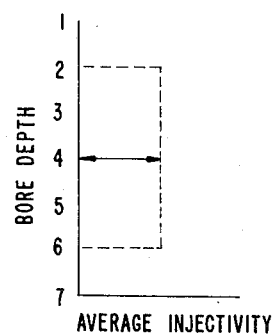
FIG. 3
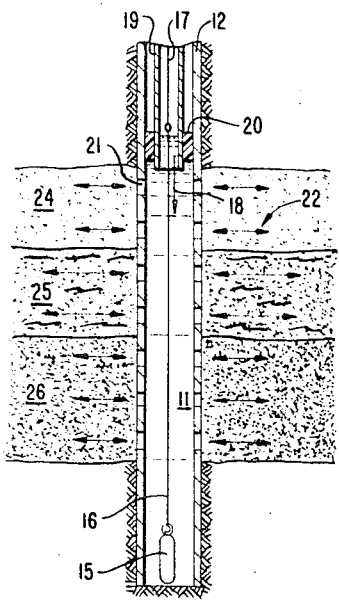
FIG. 4
FIG. 1A
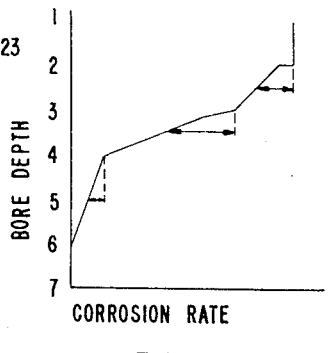
FIG. 5
FIG. 6
INVENTOR:
ROSS L. KASTOR
BY: Louis J Bovasso
HIS ATTORNEY

United States Patent Office 3,451,264
PROCESS FOR DETERMINING THE INJECTION PROFILE OF A CASED WELL
Ross L. Kastor, Houston, Tex., assignor to Shell Oil Company, New York, N.Y., a corporation of Delaware
Filed June 21, 1967, Ser. No. 647,820
Int. Cl. E21b 47/10, 47/00
U.S. Cl. 73—155                 5 Claims

ABSTRACT OF THE DISCLOSURE

The injection profile of a cased well is determined by injecting a corrodent fluid down through the cased well bore, into the earth formations surrounding the well, inserting a corrodible strand of material into the well and measuring the rate of corrosion of the strand over a period of time.

BACKGROUND OF THE INVENTION

Field of the invention

The invention relates to a process for determining the injection profile of a cased well. More particularly, it relates to the application of testing methods to determine the relative injectivities of subterranean earth formations into which a borehole has been opened.

DESCRIPTION OF THE PRIOR ART

It is highly important to the proper operation of secondary recovery processes in oil production to be able to ascertain precisely the location of each permeable stratum accepting fluid from the well bore as well as the rates at which fluid enters the various strata.

Conventional processes are limited to the temperature they can withstand. In the case of conventional spinner logs and the like, these leak instruments usually cannot withstand more than 350° F. The corrodent, corrodible strand system can operate at any temperature—operation is enhanced at higher temperatures.

SUMMARY OF THE INVENTION

It is an object of this invention to provide a new and more accurate method of determining the relative injectivities of subterranean earth formations under high temperature conditions. It is proposed, therefore, that a corrosion indicator means be applied to detect an injection profile in a well while injecting fluids therethrough, as for example, steam under both pressure and at a possibly high temperature. Thus, the relative injectivities of earth formations into which a borehole has been drilled can be determined by injecting fluid into the earth formations and measuring the relative rates at which corrodible material is corroded since this is proportional to the mass rate of flow adjacent to each of the earth formations. Further details of my invention will become apparent as the following description thereof proceeds in conjunction with the drawings.

BRIEF DESCRIPTION OF THE DRAWING

FIGURE 1 is a vertical sectional view showing a weighted corrodible strand placed in a well casing having a uniformly permeable layer of earth formations;

FIGURE 1a is a vertical view of the upper portion of the well of FIGURE 1;

FIGURE 2 is a graphical representation illustrating the relationship of the rate of corrosion to the depth of the well bore;

FIGURE 3 is a graphical representation converting the information of the graph of FIGURE 2 to actual rates of injection per foot of injection interval;

FIGURE 4 is a vertical sectional view showing a weighted corrodible strand in a well casing having layers of earth formations of varying permeability;

FIGURE 5 is a graphical representation illustrating the relationship of the rate of corrosion to the depth of the well borehole of FIGURE 4; and FIGURE 6 is a graphical representation converting the information of the graph of FIGURE 5 to actual rates of injection per foot.

DESCRIPTION OF THE PREFERRED EMBODIMENT

Referring to FIGURES 1 and 1a, a conventional lubricator is mounted at the head of a well bore 11 having a casing 12. The earth formation 13 surrounding casing 12 comprise a uniformly permeable layer 14. A heavy weighted bar 15 having a length of specimen such as wire 16 attached thereto is placed within the lubricator 1 and preferably lowered to the bottom of the well bore 11. The upper end of wire 16 extends upwardly through tubing 19 and into the lubricator 1 and out of the well bore 11. In FIGURE 1a, tubing 19 extends through casing 12 and lubricator 1 communicates with tubing 19. Control valves 2 and 3 permit communication between the well bore 11 and the chamber internally of the lubricator 1 to be shut off thereby permitting wire 16 to be lowered into well bore 11. A conventional pump 4 operatively engages the lubricator pipe 5 for pumping fluids into well bore 11 as is well known in the art. The wire 16 should be particularly susceptible to corrosion by a particular fluid, such, for example, as aluminum in dilute hydrochloric acid, etc. Accordingly, if desired for reasons of economy, the portion of wire-corrosion specimen 16 above the injection interval may be of any common wire line material, as shown at 17 in FIGURE 1.

In operation, the particular fluid 18 utilized is injected as, for example, by means of pump 4, into the well bore 11 through tubing 19. Tubing 19 is sealed in casing 12 by means of a packer 20. The fluid 18 preferably is injected before the wire 16 is lowered into well bore 11. This fluid 18 penetrates the uniformly permeable layer 14 through boreholes 21 which have been made in casing 12 by conventional methods. Once the injection rate of the fluid 18 is stabilized as indicated by a stable wellhead pressure, the wire line specimen 16, of sufficient length to reach across the injection interval, is preferably lowered to the bottom of the well bore 11. Once this corrosion wire specimen 16 is in place, any suitable corrodent capable of mixing with fluid 18 to form a corrosive fluid adapted to corrode wire 16 is injected into the fluid stream at the surface of the well bore 11 for a period ranging from one to eight hours. Injection must take place at a fairly uniform rate. At the end of this predetermined injection interval, the corrosion specimen 16 is removed from the well bore 11 by conventional methods without interrupting the injection cycle on the well bore 11. The degree of injectivity 22 of the fluid into the uniformly permeable layer 14 can now be measured. The corrosion specimen 16 is then immediately run through a testing device, such as a Wicore corrosometer, and a record is made of the location of the corrosion on the specimen 16. A Wicore corrosometer is a wire corrosion recorder that is highly accurate for allowing direct readings of the rate of corrosion of a specimen over small increments of a specimen that has been exposed to a corrosive medium. Alternatively, the specimen 16 may be preserved in oil and shipped to the nearest location where it may be read on such testing device. Since the flow rate and corrosion rate are directly related, a reduction in the amount of corrosion should be observed from near the top of the injection interval to the bottom of the injection interval. In fact, if injection is uniform through the interval, the rate of reduction of corrosion rate should be uniform throughout this space. On the other hand, if injection is occurring predominately at one short portion of the entire injection interval, then a rapid transition from a high level corrosion to one of low level should be observed in this area.

FIGURE 2 shows a plotting of the rate of corrosion versus the depth of the well bore as applied to the well of FIGURE 1. From this graph, we can obtain the average decrease in corrosion rate. The arrow in FIGURE 2 indicates the point on the graph of the average descrease in corrosion rate. The decrease in progression of the corrosion rate in the graph of FIGURE 2 is caused by the reduced mass rate of flow in casing 12 since some of the fluid has been injected. This graph bears a direct relation to the rate of injection versus the well bore depth and, by the calculation of a suitable conversion factor, actual rates of injection per foot of injection interval may be obtained by utilizing the average decrease in corrosion rate obtained in the graph of FIGURE 2. This rate of injection is shown graphically in FIGURE 3.

FIGURE 4 shows a well casing having layers of earth formations 23 of varying permeability 24, 25 and 26. Like reference numerals refer to like elements of FIGURE 1. The degree of injectivity of the medium 24, high 25 and low 26 portions of formations 23 are graphically illustrated in FIGURES 5 and 6 in the same manner as discussed above concerning FIGURES 1 through 3.

It can be seen that the conduits used may comprise any combination of tubing or casing strings and perforated or open boreholes that can provide a conduit through which fluids can flow into an interval of earth formations at the rates set by the injectivity properties of various layers of the earth formations. The fluid used may be any that can be pumped or injected through well conduits and is capable of corroding some material at a rate proportional to the mass rate of flow. The corrodible material may be disposed within the conduits in the form of a continuous or discontinuous strand that is substantially contiguous along the borehole openings into the earth formations. The rates at which the corrodible material is corroded may be measured by any physical or chemical procedures for determining the amount of corrosion that occurred at any particular location during the time for which the material was exposed to the action of the fluid. The corrosion rates along sections of such a strand are related to the average injectivities of the earth formations adjacent to the section of the strand in the manner shown graphically in FIGURES 2, 3, 5 and 6. In place of wire 16, a strip of tape banding material or similar corrodible material may be used.

I claim as my invention:
1. A process for determining the relative injectivities of subterranean earth formations comprising the steps of:
   extending a well into said subterranean earth formations;
   positioning a conduit in said well;
   establishing fluid communication between said conduit and said earth formations traversed by said conduit;
   disposing corrodible material capable of being corroded by a corrosive fluid within the conduit adjacent the earth formations in communication with said conduit;
   injecting a fluid into said conduit, stabilizing the injection rate of said fluid, and injecting a corrodent substance into said fluid being injected, the mixture of said substance and said fluid forming a corrosive fluid capable of corroding acid corrodible material; and
   after said corrosive fluid has been injected into said formations for a period of time, obtaining a measure of the relative rates of corrosion of the portions of said corrodible material adjacent each of said formations, whereby the relative injectivities of said formations may be determined.

2. The process of claim 1 wherein the step of obtaining a measure includes measuring the rate of corrosion by applying corrosion rate measuring means to said corrodible material.

3. The process of claim 1 wherein the step of injecting the corrodent corrosive fluid includes injecting said substance at a substantially uniform rate.

4. The process of claim 3 wherein the step of injecting said substance at a substantially uniform rate includes injecting said substance for a period ranging from approximately one to eight hours.

5. The process of claim 3 wherein the step of obtaining a measure includes measuring the rate of corrosion at a plurality of selected locations along said corrodible material.

References Cited
UNITED STATES PATENTS

| | | | |
|---|---|---|---|
| 2,152,306 | 3/1939 | Grebe et al. | 166—37 X |
| 2,433,718 | 12/1947 | Teplitz | 73—155 X |
| 2,696,112 | 12/1954 | Griffith | 73—155 |
| 2,724,267 | 11/1955 | Bond et al. | 73—155 |
| 3,073,154 | 1/1963 | Schaschl et al. | 73—86 |

CHARLES E. O'CONNELL, *Primary Examiner.*

IAN A. CALVERT, *Assistant Examiner.*

U.S. Cl. X.R.

166—4, 37